March 20, 1951     O. H. SCHELDORF     2,546,045
COMPRESSOR ASSEMBLY

Filed May 12, 1949     2 Sheets-Sheet 1

Inventor:
Owen H. Scheldorf,
by William G. Edwards, Jr.
His Attorney.

March 20, 1951  O. H. SCHELDORF  2,546,045
COMPRESSOR ASSEMBLY

Filed May 12, 1949  2 Sheets-Sheet 2

Inventor:
Owen H. Scheldorf,
by William G. Edwards, Jr.
His Attorney.

Patented Mar. 20, 1951

2,546,045

UNITED STATES PATENT OFFICE 2,546,045

COMPRESSOR ASSEMBLY

Owen H. Scheldorf, North East, Pa., assignor to General Electric Company, a corporation of New York Application May 12, 1949, Serial No. 92,815

7 Claims. (Cl. 309—17)

My invention relates to compressors and more particularly to self-aligning piston and connecting rod assemblies for compressors and the like.

It is an object of my invention to provide an improved self-aligning piston and connecting rod assembly.

It is another object of my invention to provide a piston and connecting rod assembly including an improved arrangement for providing for wear take-up and for compensating for manufacturing variations.

Further objects and advantages of my invention will become apparent as the following description proceeds and the features of novelty which characterize my invention will be pointed out with particularity in the claims annexed to and forming part of my invention.

In carrying out the objects of my invention, I provide a piston and connecting rod assembly which includes a wrist pin, a connecting rod, and a spring-pressed tapered key disposed in a passage in the wrist pin for connecting the connecting rod and wrist pin in self-aligning relationship. The tapered key is shaped to provide a substantial area of contact so as to minimize wear. The upper end of the connecting rod is received internally within the wrist pin so that the entire upper surface of the wrist pin is available for contact with the piston. The assembly provides take-up for any wear, compensation for manufacturing variations, and self-aligning operation.

Figure 1:
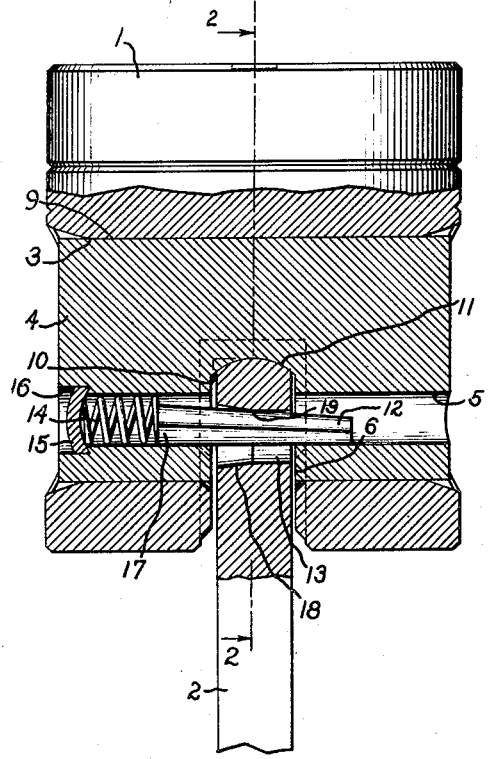
Figure 2:
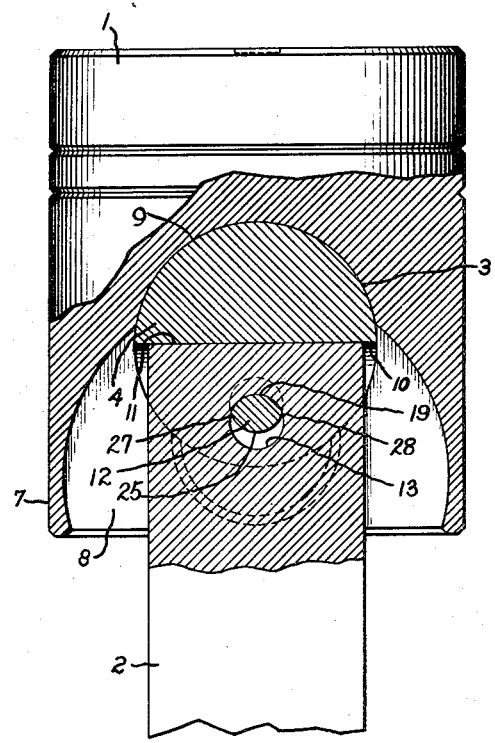
Figure 3:
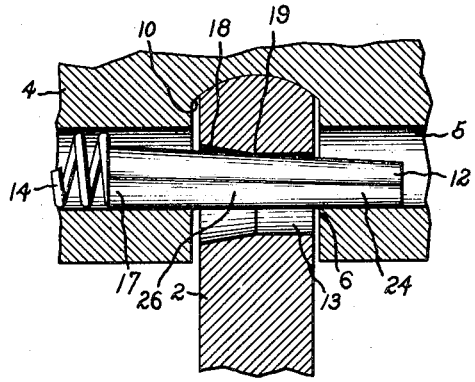
Figure 4:
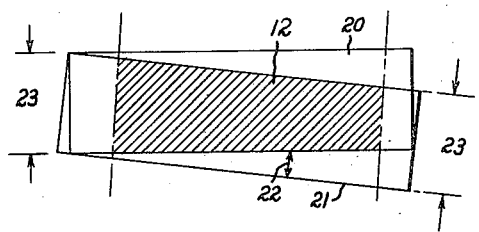
Figure 5:
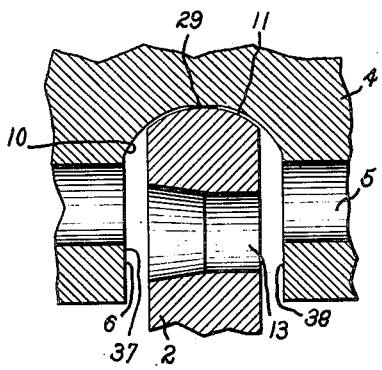
Figure 6:
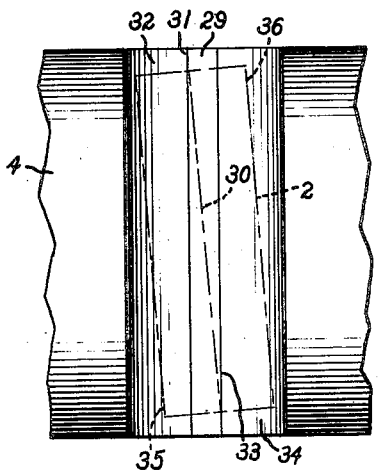

For a better understanding of my invention reference may be had to the accompanying drawing in which Fig. 1 is a sectional elevation view of a piston and connecting rod assembly; Fig. 2 is a sectional elevation view taken along the line 2—2 of Fig. 1; Fig. 3 is an enlarged view of a portion of Fig. 1; Fig. 4 illustrates the basis of the shape of one of the elements of the assembly; Fig. 5 is a sectional elevation view of a modified form of my invention; and Fig. 6 is a plan view of the wrist pin shown in Fig. 5.

Referring now to the drawing, there is shown a piston and connecting rod assembly including a piston 1 and a connecting rod 2. The piston is provided with a transverse passage 3 for receiving a cylindrical wrist pin 4. In order to provide for assembly of the connecting rod, the wrist pin includes a longitudinal passage 5 and a transverse passage 6 extending from the passage 5 downwardly through the bottom of the wrist pin. The bottom portion of the piston within the skirt 7 is provided with a large recess 8 for receiving the connecting rod and permitting lateral movement of the connecting rod during operation of the compressor.

The upper portion of the connecting rod extends through the passage 6 and into the passage 5 of the wrist pin and the connecting rod terminates within the wrist pin so that the entire upper surface 9 of the wrist pin is made available for engagement with the piston during the upward, or compression, stroke of the piston. This provision for engagement of the wrist pin with the piston along the full length of the wrist pin minimizes wear by reducing the pressure per square inch along the wrist pin bearing surface.

The wrist pin is provided internally with a recess 10 located in line with the passage 6 for receiving the upper end 11 of the connecting rod. As best shown in Figs. 1 and 3, the end of the recess 10 and the engaging surface of the upper end 11 of the connecting rod are made with the same radius of curvature so as to facilitate self-alignment of the connecting rod with the wrist pin and the piston.

In order to maintain the connecting rod in assembled relationship with the wrist pin and the piston, a tapered element or key 12 is disposed within the longitudinal passage 5 of the wrist pin. The connecting rod is provided with an opening 13 therethrough and, in the assembled position of the connecting rod, this opening 13 is in general registry with the longitudinal passage 5. The key 12, in its assembled position, extends through the opening 13 in the connecting rod. A spring or resilient member 14 is disposed within the passage 5 for urging the key 12 toward the right and into engagement with the connecting rod 2 adjacent the opening 13. A Welch plug 15 is forced into engagement with the wrist pin within an enlarged portion 16 of the longitudinal passage 5. One end of the spring 14 bears against the Welch plug 15 and the other end of the spring bears against the larger end 17 of the key 12. In order to provide a line contact between the connecting rod and the key 12 along the upper surface of the key, the opening 13 is chamfered or relieved as indicated at 18. This provision of a line contact between the key 12 and the connecting rod 2 allows for slight self-aligning movement of the connecting rod in the plane of the paper as viewed in Figs. 1 and 3. To further facilitate this self-aligning movement, the highest point of the line of contact 19 between the connecting rod and the key is located substantially at the center of the radius of curvature of the upper end 11 of the connecting rod and of the end of the recess 10.

As illustrated in Fig. 4, the tapered element 12 is formed by the intersection of two cylinders 20 and 21 inclined with respect to each other at an angle, indicated at 22, which is less than 15°. The tapered element may comprise any section within the confines of the volume included by both of the cylinders, for example, in Fig. 4 the shaded portion indicated at 12 represents the tapered element. The diameters, indicated at 23, of the two cylinders are the same. Furthermore, the diameter of the passage 5 and the diameter of the opening 13 in the connecting rod are the same as the diameter 23 of each of the two cylinders 20 and 21. By this arrangement it can be seen that the bottom half 24 of the tapered element or key 12 has substantially the same curvature as the bottom surface of the longitudinal passage 5 and hence the key 12 engages the wall of the passage 5 along substantially the entire bottom surface thereof, as indicated at 25 in Fig. 2, except, of course, for the portion 26 disposed in line with the passage 6. This distributes the force acting on the key 12 and minimizes wear. Similarly, since the diameter of the opening 13 in the connecting rod is substantially the same as the diameter of the cylinder from which the upper surface of the key 12 is formed, the key 12 engages the connecting rod along the line 19 extending along the upper surface of the key from the point 27 to the point 28. In the event of wear during operation, the tapered key 12 is urged toward the right, as viewed in Figs. 1 and 3, so as to be pressed always against the connecting rod adjacent the surface of the opening 13 and thereby to urge the upper end 11 of the connecting rod into engagement with the adjacent surface of the recess 10. Also, should there be slight variations in manufactured dimensions, the spring-biased tapered element 12 automatically adjusts itself to maintain the connecting rod and wrist pin in proper self-aligned engagement. It should be noted further that the construction of the tapered key 12 by the intersection of two cylinders inclined at an angle to each other, as described above, results in a final product which is symmetrical about a central longitudinal axis; hence, the tapered key may be placed in the assembly in the position shown or in a position rotated 180° from that shown, with no effect on the self-alignment of the assembly. Thus, this construction eliminates any possibility of securing a misassembly by inserting the tapered key upside down.

It can be seen that the assembly disclosed provides an arrangement wherein a spring-pressed tapered element continuously urges the upper end of a connecting rod into engagement with a wrist pin internally of the wrist pin. Further, this tapered element provides the sole element retaining the connecting rod and the wrist pin in assembled relationship. Since the upper end of the connecting rod is urged into engagement with the wrist pin internally of the wrist pin, the entire upper surface of the wrist pin is available for engagement with the piston, thereby minimizing the pressure per square inch on the wrist pin and piston during the compression stroke and hence minimizing wear. Finally, the forming of the tapered key 12 from two cylinders inclined with respect to each other and having a diameter substantially the same as that of the longitudinal passage in the wrist pin and the opening in the connecting rod permits a maximum area of contact between the tapered element and the wrist pin and connecting rod while at the same time retaining self-alignment of the assembly.

In the form of the invention illustrated in Figs. 1, 2, and 3, the connecting rod is permitted to move in the plane of the paper because of the line contact between the tapered key 12 and the connecting rod and because of the engaging curved surfaces of the connecting rod and the recess 10. The connecting rod is permitted to move in a plane perpendicular to the plane of the paper because of movement of the wrist pin relative to the piston. The arrangement disclosed in Figs. 1, 2, and 3 does not, however, permit twisting or winding of the connecting rod, that is, turning of the connecting rod about its longitudinal axis so that slight misalignment of the wrist pin and the crankshaft could introduce a torsional stress into the connecting rod. The modified form of my invention illustrated in Figs. 5 and 6 minimizes this torsional stress. Referring to Fig. 5, it can be seen that the upper end of the connecting rod passes transversely of the longitudinal passage 5 as before and is received within the recess 10. The upper end of the connecting rod is provided with the curved surface 11. In order to permit twisting of the connecting rod 2, the end of the recess 10 is provided with an elongated flat central surface 29 in lieu of the continuous curved surface illustrated in Figs. 1 and 2. The surface 11 of the connecting rod engages the flat surface 29 along a line indicated at 30 in Fig. 6. As shown in Fig. 6 the connecting rod 2 may twist slightly to compensate for misalignment, the maximum twisting or turning movement being reached when one end of the line of contact 30 reaches the line of intersection 31 between one side of the flat surface 29 and a curved surface 32 of the recess. The twisting of the connecting rod is also limited when the opposite end of the line of contact 30 reaches the line 33 which marks the intersection between the flat surface 29 and the curved surface 34 of the recess. Thus, any slight inaccuracies which result in a slight misalignment of the wrist pin and crankshaft are compensated by allowing the connecting rod to twist about its longitudinal axis between extreme positions wherein the ends of the line of contact 30 reach the lines of intersection between the flat surface 29 and the curved surfaces 32 and 34 of the recess. The radius of curvature of the surface 11 of the connecting rod is the same as, or at least no greater than, the radius of curvature of the surfaces 32 and 34. During operation of the compressor the flat surface 29 may gradually wear down, depending upon the magnitude of the misalignment. If wear does take place it will automatically take into account any such misalignment so that, while the limits of the twisting movement of the connecting rod may be reduced, no additional torsional stress is introduced into the connecting rod. Total wear on the wrist pin at the recess 10, if wear does take place, is limited to the wearing down of the flat surface 29. It will be noted further by reference to Fig. 6 that the shaping of the surface of the end of the recess 10 in the manner described is such that the twisting of the connecting rod is limited to an amount wherein the sides 35 and 36 of the connecting rod do not engage the walls 37 and 38, respectively, of the wrist pin.

While I have shown and described specific embodiments of my invention, I do not desire my invention to be limited to the particular construction shown and described, and I intend by the appended claims to cover all modifications within the spirit and scope of my invention.

What I claim as new and desire to secure by Letters Patent of the United States is:

1. In a self-aligning wrist pin and connecting rod assembly for compressors and the like, a wrist pin having a longitudinal passage therein, said wrist pin having a second passage therein extending transversely from said longitudinal passage through the exterior of said wrist pin, a connecting rod of rectangular cross section extending through said second passage and having a portion received within said longitudinal passage, said wrist pin having a recess in line with said second passage for receiving one end of said connecting rod, the end of said recess having an elongated flat central surface and a curved surface extending from each side of said flat central surface, said one end of said connecting rod being shaped to provide a surface having the same radius of curvature as said curved surfaces of said recess, said connecting rod having an opening therethrough in registry with said longitudinal passage of said wrist pin, a tapered element slidably disposed within said longitudinal passage and extending into said opening in said connecting rod, and a resilient member within said longitudinal passage for urging said tapered element into engagement with said connecting rod adjacent said opening in said connecting rod to force said curved end of said connecting rod into engagement with said flat central surface of said recess.

2. In a self-aligning wrist pin and connecting rod assembly for compressors and the like, a wrist pin having a longitudinal passage therein, said wrist pin having a second passage therein extending transversely from said longitudinal passage through the exterior of said wrist pin, a connecting rod extending through said second passage and having a portion received within said longitudinal passage, said wrist pin having a recess in line with said second passage for receiving one end of said connecting rod, said recess and said one end of said connecting rod having adjacent engaging surfaces of the same curvature for facilitating self-alignment of said assembly, said connecting rod having an opening therethrough in registry with said longitudinal passage of said wrist pin, a tapered element slidably disposed within said longitudinal passage and extending into said opening in said connecting rod, said opening being chamfered to provide a line contact between a surface of said opening and said tapered element, and a resilient member within said longitudinal passage for urging said tapered element into engagement with said connecting rod along said line contact to force said adjacent surfaces of said connecting rod and said recess into self-aligning engagement, said line contact including the center of the radius of curvature of said recess and said one end of said connecting rod.

3. In a self-aligning wrist pin and connecting rod assembly for compressors and the like, a wrist pin having a longitudinal passage therein, said wrist pin having a second passage therein extending transversely from said longitudinal passage through the exterior of said wrist pin, a connecting rod extending through said second passage and having one end received within said longitudinal passage, said connecting rod having an opening therethrough in registry with said longitudinal passage, a tapered element slidably disposed within said longitudinal passage and extending into said opening in said connecting rod, said tapered element being formed by the intersection of two cylinders at an angle of less than 15° with each other, and a resilient member within said longitudinal passage for urging said tapered element into engagement with said connecting rod adjacent said opening in said connecting rod to force said one end of said connecting rod into engagement with said wrist pin.

4. In a self-aligning wrist pin and connecting rod assembly for compressors and the like, a wrist pin having a longitudinal passage therein, said wrist pin having a second passage therein extending transversely from said longitudinal passage through the exterior of said wrist pin, a connecting rod extending through said second passage and having one end received within said longitudinal passage, said connecting rod having an opening therethrough in registry with said longitudinal passage, a tapered element slidably disposed within said longitudinal passage and extending into said opening in said connecting rod, said tapered element being formed by the intersection of two cylinders at an angle of less than 15° with each other, said longitudinal passage, said opening in said connecting rod, and said cylinders all having substantially the same diameter, and a resilient member within said longitudinal passage for urging said tapered element into engagement with said connecting rod adjacent said opening in said connecting rod to force said one end of said connecting rod into engagement with said wrist pin.

5. In a self-aligning wrist pin and connecting rod assembly for compressors and the like, a wrist pin having a longitudinal passage therein, said wrist pin having a second passage therein extending transversely from said longitudinal passage through the exterior of said wrist pin, a connecting rod extending through said second passage and having a portion received within said longitudinal passage, said wrist pin having a recess in line with said second passage for receiving one end of said connecting rod, said recess and said one end of said connecting rod having adjacent engaging surfaces of the same curvature for facilitating self-alignment of said assembly, said connecting rod having an opening therethrough in registry with said longitudinal passage of said wrist pin, a tapered element slidably disposed within said longitudinal passage and extending into said opening in said connecting rod, said tapered element being formed by the intersection of two cylinders at an angle of less than 15° with each other, the diameters of said longitudinal passage, said opening in said connecting rod and said cylinders all being substantially the same, and a resilient member within said longitudinal passage for urging said tapered element into engagement with said connecting rod adjacent said opening in said connecting rod to force said adjacent surfaces of said connecting rod and said recess into self aligning engagement, said tapered element engaging said connecting rod along a line including the center of the radius of curvature of said adjacent surfaces of said connecting rod and said recess.

6. In a piston and connecting rod assembly for compressors and the like, a reciprocating piston having a transverse passage therein, a wrist pin received within said passage, said wrist pin having a longitudinal passage therein, said wrist pin having a second passage therein extending downwardly from said longitudinal passage through the bottom of said wrist pin, a connecting rod of rectangular cross section extending through said second passage and having an upper portion received within said longitudinal passage, said wrist pin having a recess in line with said second passage for receiving the upper end of said connecting rod, the end of said recess having an elongated flat central surface and a curved surface extending from each side of said flat central surface, said upper end of said connecting rod being shaped to provide a surface having the same radius of curvature as said curved surfaces of said recess, said connecting rod having an opening therethrough in registry with said longitudinal passage of said wrist pin, a tapered element slidably disposed within said longitudinal passage and extending into said opening in said connecting rod, and a resilient member within said longitudinal passage for urging said tapered element into engagement with said connecting rod adjacent said opening in said connecting rod to force said curved end of said connecting rod into engagement with said flat central surface of said recess.

7. In a piston and connecting rod assembly for compressors and the like, a reciprocating piston having a transverse passage therein, a wrist pin received within said passage, said wrist pin having a longitudinal passage therein, said wrist pin having a second passage therein extending downwardly from said longitudinal passage through the bottom of said wrist pin, a connecting rod extending through said second passage and having a portion received within said longitudinal passage, said connecting rod terminating within said wrist pin wherein the entire length of said wrist pin along the top surface thereof is available for engagement with said piston, said wrist pin having a recess in line with said second passage for receiving the upper end of said connecting rod, said recess and said upper end of said connecting rod having adjacent engaging surfaces of the same curvature for facilitating self-alignment of said assembly, said connecting rod having an opening therethrough in registry with said longitudinal passage, a tapered element slidably disposed within said longitudinal passage and extending into said opening in said connecting rod, said tapered element being formed by the intersection of two cylinders at an angle less than 15° with each other, said longitudinal passage, said opening in said connecting rod and said cylinders all having substantially the same diameter, and a resilient member within said longitudinal passage for urging said tapered element into engagement with said connecting rod adjacent said opening in said connecting rod to force said adjacent surfaces of said connecting rod and said recess into self-aligning engagement.

OWEN H. SCHELDORF.

REFERENCES CITED

The following references are of record in the file of this patent:

UNITED STATES PATENTS

| Number | Name | Date |
|---|---|---|
| 1,480,185 | Setter | Jan. 8, 1924 |
| 1,921,607 | Curtis | Aug. 8, 1933 |